(12) United States Patent
Hung et al.

(10) Patent No.: US 11,106,241 B2
(45) Date of Patent: Aug. 31, 2021

(54) DISPLAY DEVICE

(71) Applicant: AU OPTRONICS CORPORATION, Hsin-Chu (TW)

(72) Inventors: Po-Lan Hung, Hsin-Chu (TW); Yu-Tsung Huang, Hsin-Chu (TW); Wen-Pin Shen, Hsin-Chu (TW); Li-Chih Hsu, Hsin-Chu (TW); Pei-Chia Wu, Hsin-Chu (TW); Yen-Po Wang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/704,362

(22) Filed: Dec. 5, 2019

(65) Prior Publication Data

US 2020/0183454 A1    Jun. 11, 2020

Related U.S. Application Data

(60) Provisional application No. 62/775,480, filed on Dec. 5, 2018.

(30) Foreign Application Priority Data

Sep. 20, 2019   (TW) .................................. 108134006

(51) Int. Cl.
*G06F 1/16*    (2006.01)
*G02F 1/1333*    (2006.01)
(Continued)

(52) U.S. Cl.
CPC ...... *G06F 1/1637* (2013.01); *G02F 1/133308* (2013.01); *G02F 1/133528* (2013.01);
(Continued)

(58) Field of Classification Search
CPC ......... G02F 1/133308; G02F 1/133528; G02F 2001/133311; G02F 2001/133314;
(Continued)

(56) References Cited

U.S. PATENT DOCUMENTS 8,259,266 B2    9/2012  Huang et al.
8,905,563 B2    12/2014 Wu et al.
(Continued)

FOREIGN PATENT DOCUMENTS

CN    102981566 A    3/2013
CN    105652491 A    6/2016
(Continued)

OTHER PUBLICATIONS

CNIPA has issued the Office Action for the corresponding China application dated Apr. 25, 2021.

*Primary Examiner* — Tsion Tumebo
(74) *Attorney, Agent, or Firm* — WPAT, PC

(57) ABSTRACT

The present invention provides a display device including: a backlight module, including a back bezel having a bottom surface, and a frame having a side wall portion, where the side wall portion has an inner side surface and an outer side surface, and the back bezel faces the inner side surface of the side wall portion; a display module, disposed on the backlight module and supported by the frame; a tape, attached to the outer side surface of the side wall portion of the frame and extending to the bottom surface of the back bezel; and a sealant, disposed and extending from an end edge of the display module to the bottom surface of the back bezel through an outer side of the outer side surface of the side wall portion of the frame, and at least partially covering the tape.

15 Claims, 9 Drawing Sheets

(51) Int. Cl.
  *G02F 1/1335*  (2006.01)
  *H05K 5/00*  (2006.01)
(52) U.S. Cl.
  CPC ......... *G06F 1/1656* (2013.01); *H05K 5/0017* (2013.01); *G02F 1/133311* (2021.01); *G02F 1/133314* (2021.01); *G02F 1/133317* (2021.01)
(58) Field of Classification Search
  CPC ..... G02F 2001/133317; G02F 2201/08; G02F 2202/28; G06F 1/1601; G06F 1/1637; G06F 1/1656; H05K 5/0017
  See application file for complete search history.

(56) References Cited

U.S. PATENT DOCUMENTS

| | | | |
|---|---|---|---|
| 9,049,409 B2* | 6/2015 | Lee | H04M 1/0266 |
| 9,851,492 B2 | 12/2017 | Shin | |
| 9,927,643 B2 | 3/2018 | Kim et al. | |
| 2010/0165586 A1* | 7/2010 | Tsai | G02F 1/133308 |
| | | | 361/749 |
| 2012/0281383 A1* | 11/2012 | Hwang | H05K 7/02 |
| | | | 361/807 |
| 2013/0050820 A1* | 2/2013 | Shin | G06F 1/1601 |
| | | | 359/465 |
| 2013/0057801 A1* | 3/2013 | Park | G02F 1/136209 |
| | | | 349/58 |
| 2014/0092631 A1* | 4/2014 | Fujii | G02B 6/0011 |
| | | | 362/611 |
| 2014/0160694 A1* | 6/2014 | Yoon | H05K 13/00 |
| | | | 361/749 |
| 2014/0177154 A1* | 6/2014 | Lee | G06F 1/1637 |
| | | | 361/679.26 |
| 2014/0368747 A1* | 12/2014 | Lee | H04N 5/655 |
| | | | 348/794 |
| 2015/0198756 A1* | 7/2015 | Song | G02B 6/0025 |
| | | | 349/65 |
| 2015/0234511 A1* | 8/2015 | Wang | H01L 27/323 |
| | | | 345/173 |
| 2016/0085111 A1* | 3/2016 | Arita | G02F 1/133308 |
| | | | 349/58 |
| 2017/0031202 A1* | 2/2017 | Lee | B32B 7/00 |
| 2017/0123260 A1* | 5/2017 | Kim | G02F 1/133308 |
| 2018/0157090 A1* | 6/2018 | Kim | G02F 1/133308 |
| 2018/0210267 A1* | 7/2018 | Zhang | G02B 6/0023 |

FOREIGN PATENT DOCUMENTS

| | | |
|---|---|---|
| JP | 2000-293309 A | 10/2000 |
| TW | I382232 | 1/2013 |
| TW | 201304961 A | 2/2013 |
| TW | 201430453 A | 8/2014 |
| TW | I451170 | 9/2014 |

* cited by examiner

DISPLAY DEVICE

BACKGROUND

Technical Field

The present invention relates to a display device. Particularly, the present invention relates to a display device having a tape and a sealant.

Related Art

To improve a visual effect of a display device, a frame may be reduced or removed to implement a narrow frame display device or even a frameless display device. However, when the frame is reduced or removed, assembly attachment areas of modules and assemblies of the display device might be reduced, thereby reducing joint strength between a display module and a backlight module, increasing a probability of light leakage of the display module, and increasing a risk that dust impurities and moisture enter the display device. Therefore, when a narrow frame display device or even a frameless display device is developed, an unexpected defect may occur, thereby reducing quality of the display device. In addition, an assembly gap needs to be reserved for assembling the display device and other modules and assemblies, and a structure thickness needs to be reserved for a side wall of a module exterior housing. These factors all restrict a degree for reducing or removing the frame of the display device, and therefore are not conducive to the development for a narrow frame display device or even a frameless display device.

SUMMARY

Technical Means to Solve Problems

To solve the foregoing problems, one embodiment of the present invention provides a display device including: a backlight module, including a back bezel having a bottom surface, and a frame having a side wall portion, where the side wall portion has an inner side surface and an outer side surface, and the back bezel faces the inner side surface of the side wall portion; a display module, disposed on the backlight module and supported by the frame; a tape, attached to the outer side surface of the side wall portion of the frame and extending to the bottom surface of the back bezel; and a sealant, disposed and extending from an end edge of the display module to the bottom surface of the back bezel through an outer side of the outer side surface of the side wall portion of the frame, and at least partially covering the tape.

Effects Compared to the Prior Art

According to the display device provided in the embodiments of the present invention, by disposing the tape and the sealant on an end edge of the display module and an end edge of the backlight module, and covering the end edge of the display module and the end edge of the backlight module, joint strength between modules and assemblies of the display device can be enhanced, a probability of light leakage can be reduced, and a risk that dust enters or moisture penetrates into the display device can be reduced. Therefore, according to the display device provided in the embodiments of the present invention, stability, a display effect, and reliability of the display device can be improved while implementing a narrow frame visual effect display device or even a frameless visual effect display device. Further, according to the display device provided in the embodiments of the present invention, an exterior part made of original rigid housing materials may be replaced with a sealant as at least a part of the frame, thereby greatly reducing a thickness of this part of the frame.

DETAILED DESCRIPTION

Figure 1:
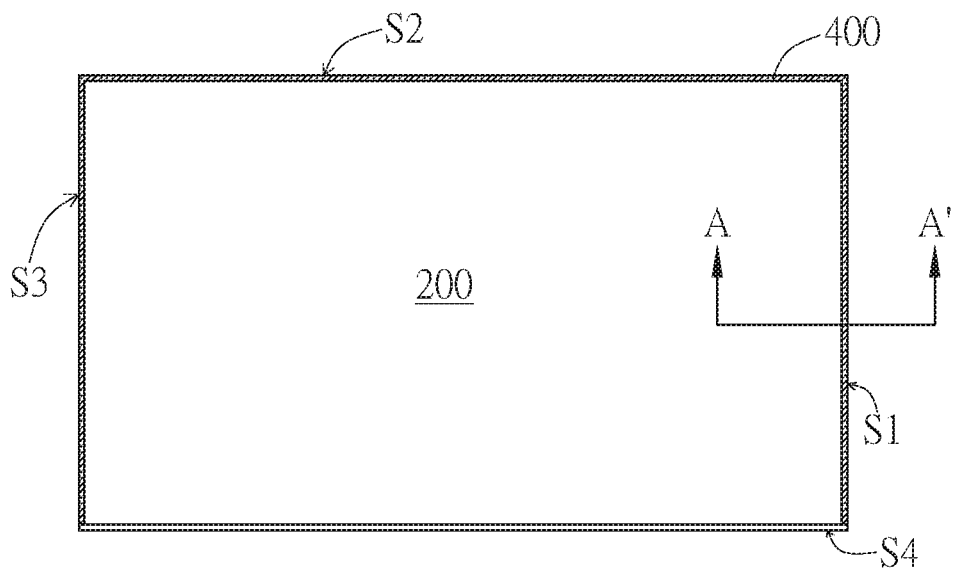
FIG. 1 is a schematic plane diagram of a display device according to an embodiment of the present invention.

Various embodiments are described below, and a person of ordinary skill in the art may readily understand the spirit and principle of the present invention with reference to the description in conjunction with accompanying drawings. However, although some particular embodiments are described in detail herein, these embodiments are merely used as examples, and in all aspects, these embodiments are not regarded as a limitative or exhaustive meaning. Therefore, for a person of ordinary skill in the art, various changes and modifications made to the present invention should be apparent and easy to achieve without departing from the spirit and principle of the present invention.

The thickness of a layer, a film, a panel, a region, and the like are amplified for clear description in the accompanying drawings. In the entire specification, same element symbols indicate same elements. It should be understood that, when an element such as a layer, a film, a region, or a substrate is referred to as "on" or "connected to" another element, it may be directly on another element or be connected to another element, or an intermediate element may further exist. By contrast, when an element is referred to as "directly on another element" or "directly connected to" another element, there is no intermediate element. The "connected" used herein may refer to physically and/or electrically connected. Besides, the "electrically connected" or "coupled" may refer to that other elements exist between two elements.

It should be understood that, although terms such as "first", "second", and "third" herein are used to describe various elements, components, regions, layers and/or parts, the terms are not intended to limit these elements, components, regions, and/or parts. The terms are only intended to distinguish one element, component, region, layer, or part from another element, component, region, layer or part. Therefore, a "first element", "first component", "first region", "first layer", or "first part" discussed below may be referred to as a second element, a second component, a second region, a second layer, or a second part without departing from the teaching herein.

Terms used herein are only intended to describe an objective of a particular embodiment rather than to limit the present invention. Unless the content clearly indicates otherwise, the singular forms such as "a", "one", and "the" used herein are intended to include plural forms, including "at least one". "Or" indicates "and/or". The term "and/or" used herein includes any and all combinations of one or more related listed items. It should also be understood that, when used in this specification, the terms "include" and/or "comprise" indicate existence or addition of the stated feature, region, entirety, step, operation, element, and/or component. However, existence or addition of one or more other features, regions, entirety, steps, operations, elements, components and/or combinations thereof is not excluded.

The exemplary embodiments are described with reference to schematic cross-sectional views of ideal embodiments herein. Therefore, it may be anticipated that changes from the shape shown in the drawings might be resulted from a manufacturing technology and/or a tolerance. Therefore, the embodiments in the present invention shall not be explained as being limited to a particular shape of the region shown herein, but include, for example, a shape deviation caused by manufacturing. For example, a shown or described flat region may generally have a rough and/or non-linear feature. In addition, the shown acute angle may be round. Therefore, the region shown in the figure is essentially schematic, and their shapes are not intended to indicate a precise shape of the region or limit claims of this application.

Referring to a schematic plane diagram of an embodiment of a display device 10 shown in FIG. 1, configurations and structures according to the embodiments of the present invention may be applied to an end edge of a side edge of the display device 10, so as to achieve an effect of reducing a visual width of a frame. For example, the configurations and structures may be implemented on side edges S1, S2, and S3 of the display device 10. As described above, in some embodiments, the side edges S1, S2, and S3 may be side edges of the display device 10 at which no circuit substrate is disposed. However, the present invention is not limited thereto. If no conflict occurs, the configurations and structures according to the embodiments of the present invention may at least partially be implemented on a side edge of the display device 10 at which a circuit substrate (not shown) is disposed. For example, a side edge S4. In addition, locations of the side edges S1 to S4 and whether a circuit substrate is disposed are all used as examples, and the present invention is not limited thereto. That is, provided that there is no conflict with other structures, the configurations and structures according to the embodiments of the present invention may be applied to different end edges of side edges of different display devices.

As described above, FIG. 2A and FIG. 2B are respectively a cross-sectional oblique view and a cross-sectional front view of the end edges of the side edges of the display device 10 taken along a cross-section line A-A' in FIG. 1. The display device 10 according to an embodiment of the present invention includes a backlight module 100, a display module 200 disposed on the backlight module 100, a tape 300 attached to an end edge of a side edge of the display device 10, and a sealant 400 disposed on an end edge of a side edge of the display device 10.

According to an embodiment of the present invention, the backlight module 100 includes a back bezel 120 having a bottom surface 125, and a frame 140 having a side wall portion 150. The back bezel 120 and the frame 140 of the backlight module 100 may be used to define a space for accommodating various components G (such as a light source, a light-guide component, an optical film, a reflecting plate, and the like) of the backlight module 100. Herein, for brevity and clarity, drawings of these components G are omitted in some figures after FIG. 2B, and these structures are not described in detail in this specification. The following mainly describes configurations and structures of an end edge of a side edge according to the embodiments of the present invention applied to reduce an appearance width of a frame. In addition, an element of the component G may be increased/decreased, adjusted, or changed based on requirements, and this is not particularly limited herein.

Specifically, the frame 140 has at least a side wall portion 150, and the frame 140 may support the display module 200. For example, as shown in FIG. 2B, the frame 140 may include the side wall portion 150 and a top wall portion 160 connected to the side wall portion 150, and may present an approximately L-shaped cross-section. In this embodiment, the display module 200 may be supported by the top wall portion 160 (for example, supported in a manner of using an intermediate adhesion element 15 to connect). The side wall portion 150 includes an inner side surface 152 facing the interior of the display device 10, and an outer side surface 154 opposite to the interior of the display device 10. The back bezel 120 described above faces the inner side surface 152 of the side wall portion 150. In some embodiments, as shown in FIG. 2B, the back bezel 120 may include a wall W extending in a direction away from the bottom surface 125 of the back bezel 120, that is, the wall W protrudes towards the display module 200. In addition, the wall W is below the top wall portion 160 and abuts against to the top wall portion 160 of the frame 140. As described above, an end portion of the wall W is located at a side of the inner side surface 152 of the side wall portion 150.

Figure 2A:
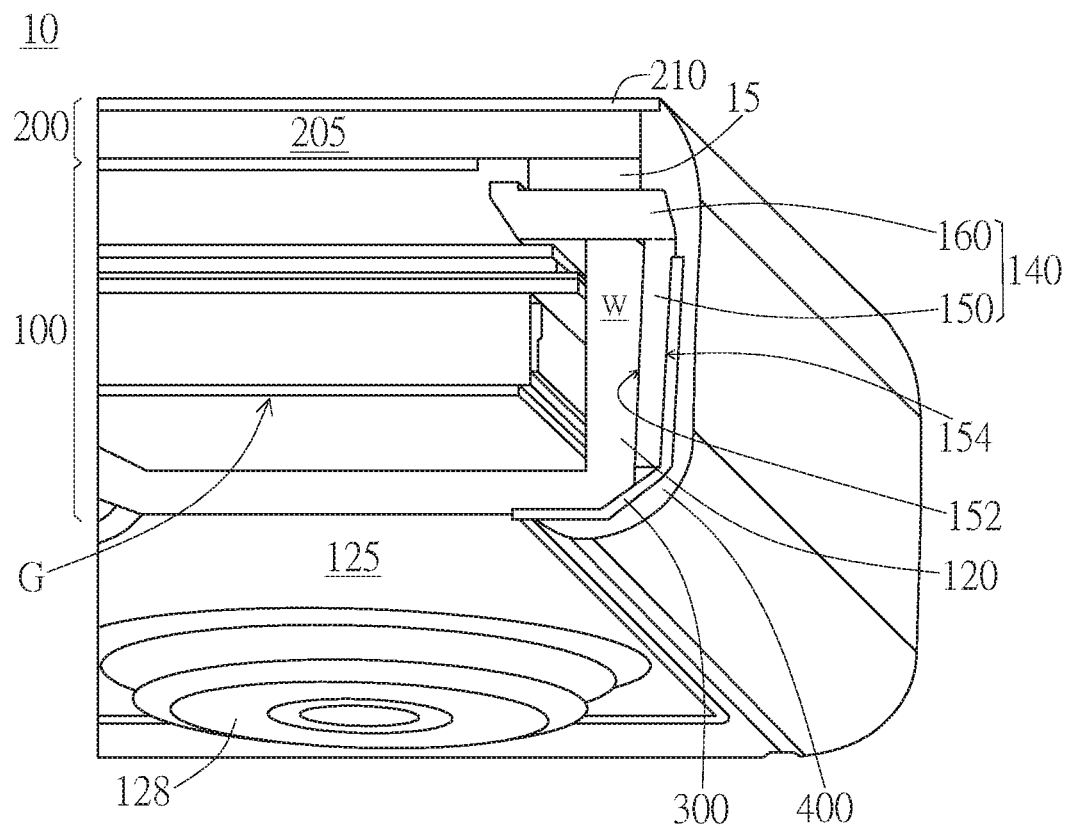
FIG. 2A and FIG. 2B are respectively a cross-sectional oblique view and a cross-sectional front view of a display device taken along a cross-section line A-A' in FIG. 1 according to an embodiment of the present invention.
Figure 2B:
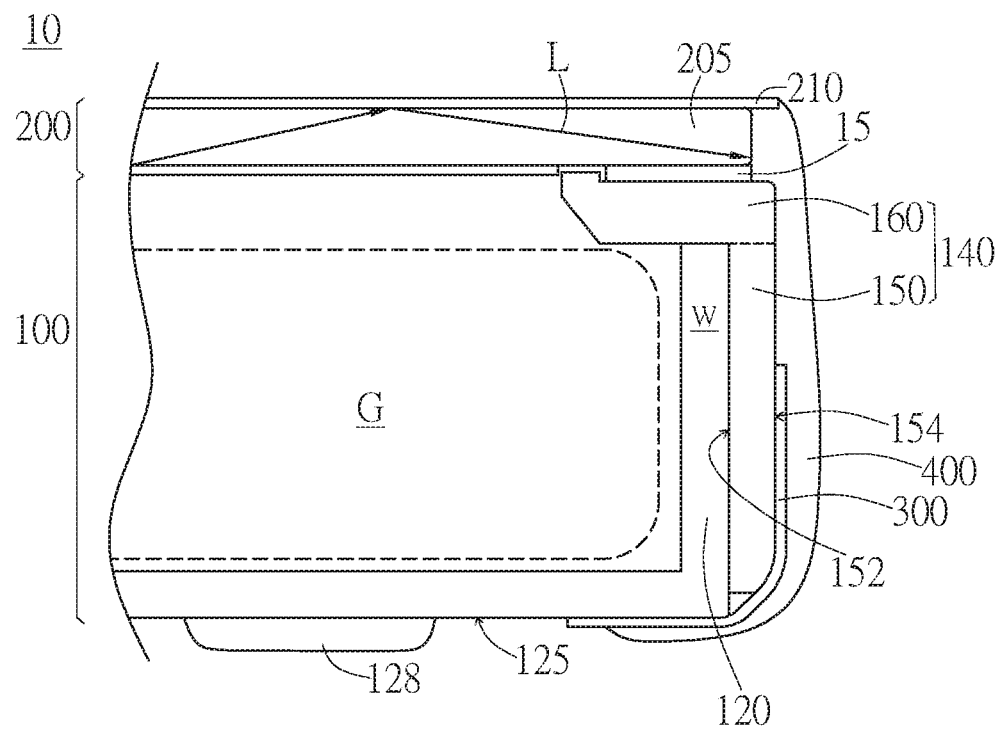

As shown in FIG. 2A and FIG. 2B, the tape 300 may be attached to the outer side surface 154 of the side wall portion 150 of the frame 140 at the end edge of the side edge of the display device 10, and extends towards the bottom surface 125 of the back bezel 120 to reach the bottom surface 125. With this configuration, the tape 300 may cross a border between the back bezel 120 and the frame 140.

In some embodiments, the tape 300 may be easy-to-pull adhesive tape such as a 3M traceless double-sided tape, or a single double-sided tape including a base material (PET/ elastic film layer). However, the present invention is not limited thereto.

Then, the sealant 400 may be applied in a manner such as coating to extend from an end edge of the display module 200 to the bottom surface 125 of the back bezel 120 through an outer side of the outer side surface 154 of the side wall portion 150 of the frame 140. As described above, the sealant 400 may be in direct contact with the outer side surface 154 of the side wall portion 150 on the outer side surface 154 of the side wall portion 150, or may be indirectly coated on the outer side surface 154 of the side wall portion 150 with the tape 300 as an intermediary. The region coated by the sealant 400 at least partially overlaps the region where the tape 300 is attached, and the sealant 400 may at least partially cover the tape 300. As described above, as shown in FIG. 2A and FIG. 2B, the sealant 400 may cover an end edge of the display module 200, and fill a segment gap between a border of the display module 200 and the backlight module 100.

According to an embodiment, the display module 200 may at least include a display panel 205, and may further include a polarizer 210 disposed on a top end of the display panel 205. As described above, the sealant 400 may cover from the top end of the display module 200 (for example, covering from an end edge of the polarizer 210) and extend to cover a side edge of the display module 200 until the sealant 400 crosses a border between the side wall portion 150 of the frame 140 and the back bezel 120 (for example, the wall W of the back bezel 120) to reach the bottom surface 125. In addition, preferably, the sealant 400 and the tape 300 extend along a side edge of the display device 10 to completely cover the side edge of the display device 10, but are not limited thereto.

Since the tape 300 is attached across the border between the back bezel 120 and the side wall portion 150 of the frame 140 (for example, across the wall W of the back bezel 120, but is not limited thereto), a probability that the sealant 400 penetrates into the display device 10 at the border can be avoided or reduced.

In some embodiments, the sealant 400 may be a silicone resin, but the present invention is not limited thereto.

As described above, according to an embodiment, the attached tape 300 and the covering sealant 400 may be disposed at the end edge of the side edge of the display device 10, and the sealant 400 may cover both the end edge of the display module 200 and an end edge of the backlight module 100, so that when viewed from an outer side, the display module 200 and the backlight module 100 may have a greater integrity. In this way, the assembly stability of the backlight module 100 and the display module 200 may also be improved. In addition, the covering sealant 400 and the attached tape 300 may prevent outer dust impurities and moisture from entering or penetrating into the border between the side wall portion 150 and the back bezel 120, the assembly border of the display module 200 and the backlight module 100, and/or borders between the various components of the display module 200, thereby reducing or avoiding quality deterioration of the display device 10. Besides, first attaching the tape 300 and then covering the sealant 400 can prevent the sealant 400 from penetrating into the backlight module 100 before solidified. Further, according to an embodiment, the sealant 400 may include material capable of absorbing light or reflecting light. In this way, light propagated and emitted through the sealant 400 can be reduced or prevented. That is, the sealant 400 may shield other light leakage paths than an expected display direction. For example, referring to FIG. 2B, since the sealant 400 covering the end edge of the display module 200 extends towards the backlight module 100, light L through the interior of the display module 200 is not emitted from the end edge of the display module 200 or the border of the display module 200 and the backlight module 100, thereby reducing or avoiding a probability of light leakage on sides. Therefore, when the display device 10 according to this embodiment of the present invention is applied to a structure from which a frame is reduced or removed, a more complete covering shading effect can be achieved by using the sealant 400 even though there is no module exterior housing for shielding, thereby facilitating implementation of the narrow frame display device 10 or frameless display device 10.

Figure 3:
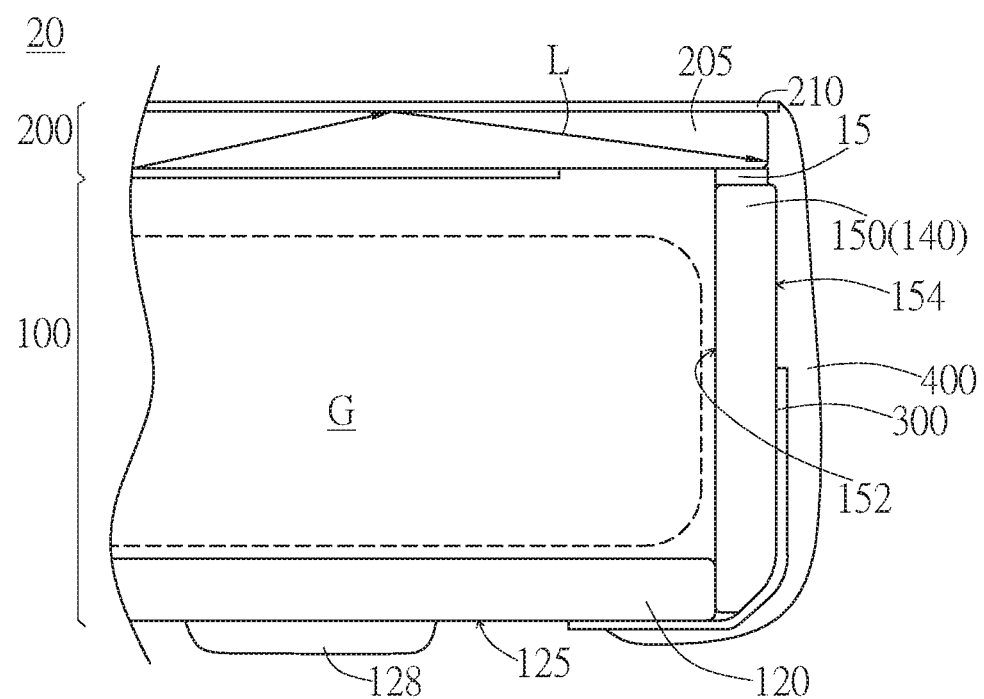
FIG. 3 is a cross-sectional front view of a display device taken along the cross-section line A-A' in FIG. 1 according to another embodiment of the present invention.

In addition, in a display device 20 according to another embodiment of the present invention, referring to FIG. 3, the frame 140 may include the side wall portion 150 only and not include the top wall portion 160, and the back bezel 120 may not have the wall W. As described above, the back bezel 120 may face the inner side surface 152 of the side wall portion 150. In this embodiment, the display module 200 may be attached to a top portion of the side wall portion 150 of the frame 140 by using the adhesion element 15 such as a tape or a glue layer. Structures and details except this are the same as or similar to those of the foregoing embodiments described with reference to FIG. 2A and FIG. 2B, and are not repeated herein.

For brevity, in figures shown in FIG. 4A to FIG. 6, a frame 140 having the top wall portion 160 and a back bezel 120 having a wall W will be used as an example for description below. Scales and relative scales of the components are adjusted, and the components (such as a light source, a light-guide component, an optical film, a reflecting plate, and the like) accommodated in the backlight module 100 are omitted to facilitate illustration. However, a person of ordinary skill in the art should understand that this is only an example. The shapes of the frame 140 and the back bezel 120, and the scales and the relative scales of the components of the present invention are all not limited thereto.

Figure 4A:
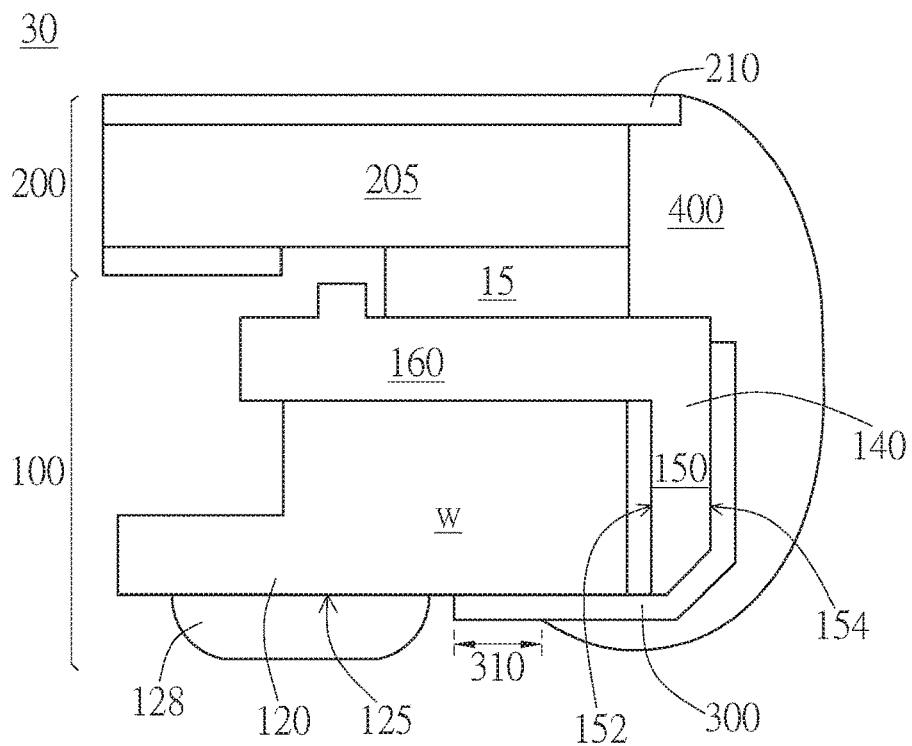
FIG. 4A and FIG. 4B are schematic diagrams of performing rework by using a tape configuration according to still another embodiment of the present invention.
Figure 4B:
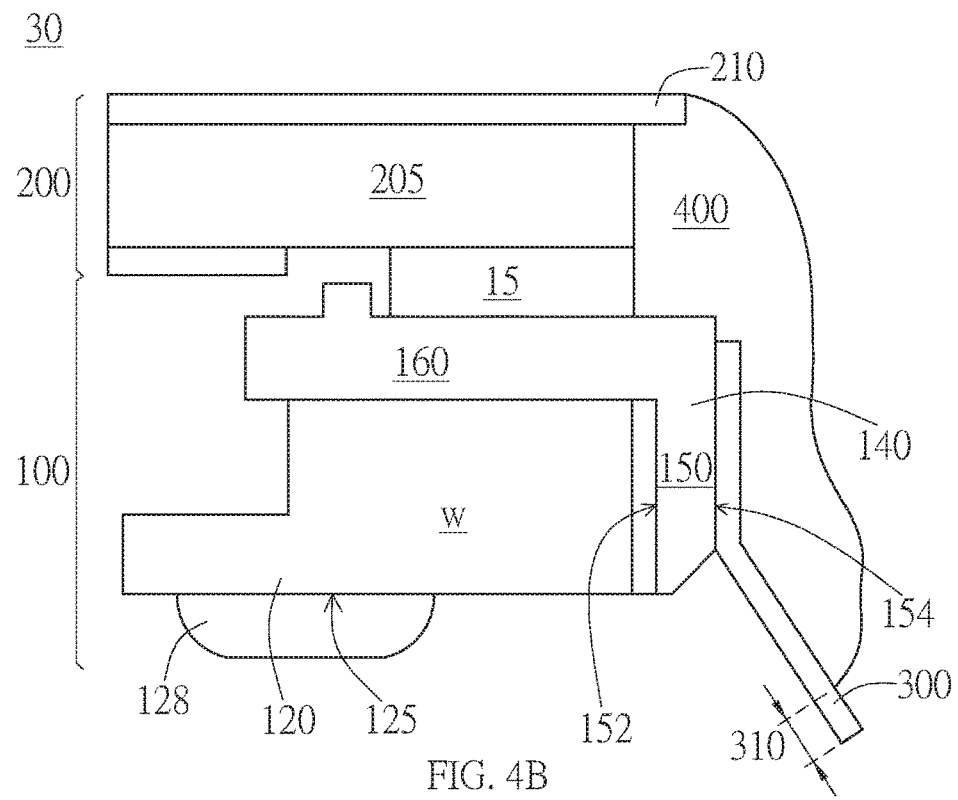

As described above, referring to FIG. 4A, according to an embodiment of the present invention, similar to the display device 10 and the display device 20, a display device 30 also includes the tape 300 attached to the outer side surface 154 of the side wall portion 150 of the frame 140 at an end edge of a side edge of the display device 30, and extending towards the bottom surface 125 of the back bezel 120 to reach the bottom surface 125. Further, the sealant 400 may be applied in a manner such as coating to an end edge of the display module 200 and an end edge of the backlight module 100, and at least partially overlap the tape 300. In this configuration, the tape 300 may have an exposed portion 310 that is at the bottom surface 125 and not covered by the sealant 400. In this way, as shown in FIG. 4B, when a rework is required, the tape 300 may be peeled off from the exposed portion 310, so as to further remove the sealant 400 on the tape 300. Therefore, the convenience of the rework can be improved. In addition, although the tape 300 has the exposed portion 310 at the cross-section shown in FIG. 4A and FIG. 4B, the tape 300 might not have the exposed portion 310 in other different cross-sections. That is, the sealant 400 extends to be equal to or exceed an end portion of the tape 300 and be attached to the bottom surface 125.

According to an embodiment of the present invention, the viscosity of the sealant 400 may be greater than that of the tape 300. That is, since the viscosity of the tape 300 is relatively low, the tape 300 may be easy to be peeled off. In this way, the covering tightness and stability of the sealant 400 can be enhanced, while the sealant 400 can be still easily removed by peeling off the tape 300 when a rework is required.

Figure 5:
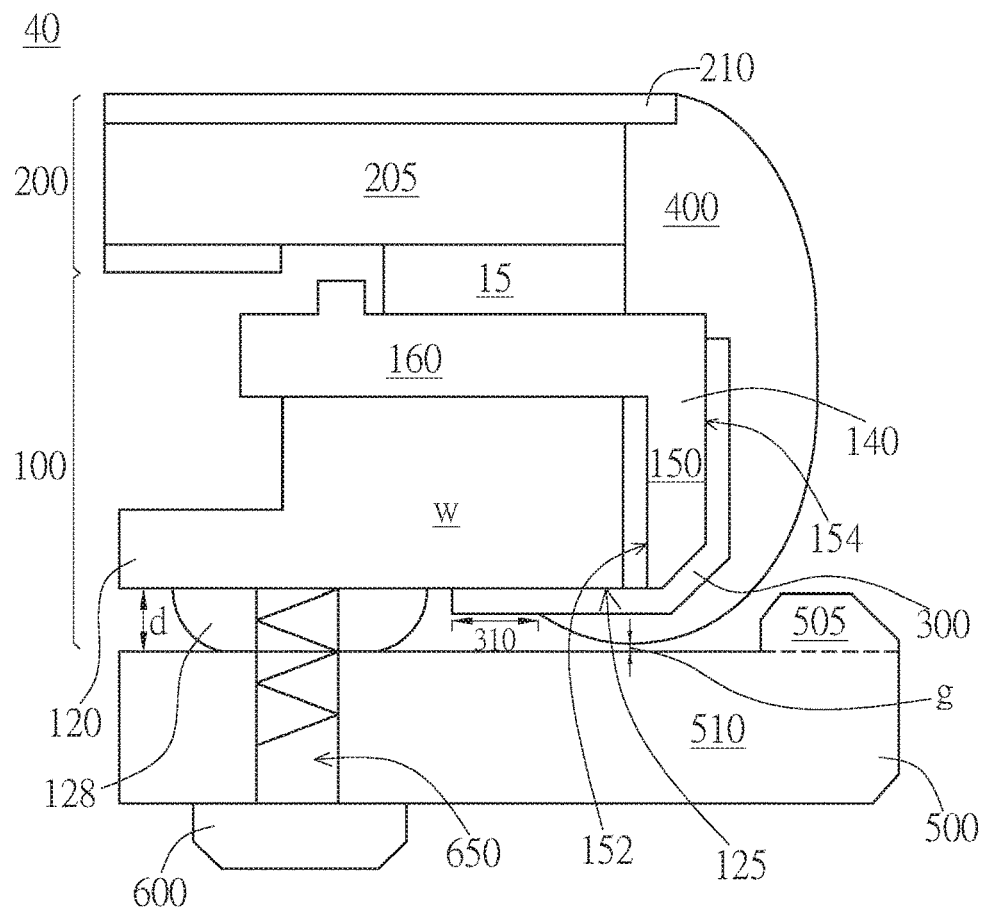
FIG. 5 is a cross-sectional view of a display device including a rear housing according to still another embodiment of the present invention.

Next, a display device 40 according to still another embodiment of the present invention will be described with reference to FIG. 5. In this embodiment, the display device 40 further includes a rear housing 500. The rear housing 500 has a base plate 510 located below the bottom surface 125 of the back bezel 120 at a distance d. As described above, the rear housing 500 may be connected to the back bezel 120 and be located by using a fixing element 600. For example, the rear housing 500 penetrates a hole 650 of the base plate 510 by using the fixing element 600 such as a screw and is fastened to a protrusion portion 128 of the back bezel 120 to be connected to the back bezel, but a manner used for locating in the present invention is not limited thereto. In addition, according to some embodiments, the distance d between the bottom surface 125 of the back bezel 120 and the base plate 510 of the rear housing 500 might be resulted from the existence of the protrusion portion 128, such that the sealant 400 protruding from the bottom surface 125 to the base plate 510 does not interfere with the base plate 510 of the rear housing 500. However, the foregoing description is merely an example, and a corresponding structure formed on the back bezel 120 for locking the fixing element 600 is not limited to the example described in detail herein.

Specifically, the rear housing 500 may serve as an exterior part or a housing to protect modules and assemblies inside the display device 40. According to an embodiment of the present invention, since the covering of the sealant 400, the rear housing 500 may not need to protect or shield some or all end edges of side edges of the display device 40, for example, end edges of the display module 200 or end edges of the backlight module 100. Therefore, an exterior part such as the rear housing 500 does not need to be disposed on the end edge of the side edge of the display device 40, so that the assembly gap required when an exterior part is disposed on the end edge of the side edge of the display device 40 and the structure thickness reserved for a hard material exterior part to maintain stability can be removed or reduced, thereby realizing the display device 40 with an appearance from which a frame is reduced or removed. Besides, the rear housing 500 covers an end of the sealant 400 extending to the bottom surface 125 of the back bezel 120, so that that the end is exposed and unexpectedly peeled off due to pulling or touching accidentally can be avoided.

Specifically, in this type of embodiments, for example, the sealant 400 may be regarded as an exterior part or a protection housing of the end edge of the side edge of the display device 40. Specifically, the sealant 400 may be regarded by a user as a part of the exterior part, thereby realizing the narrow frame display device 40. However, according to some embodiments, the sealant 400 may not be detected by a user as a result of a visual effect, thereby realizing the frameless display device 40.

In this embodiment, if the distance d exists between the bottom surface 125 of the back bezel 120 and the base plate 510 of the rear housing 500, a thickness of the sealant 400 formed on the bottom surface 125 is preferably less than the distance d, so as to avoid or reduce interference between the sealant 400 and the rear housing 500.

In addition, according to this embodiment of the present invention, the rear housing 500 may further include a shielding wall structure 505 protruding from a periphery of the base plate 510. As shown in FIG. 5, if the polarizer 210 is set as the topmost surface to indicate directivity, then the shielding wall structure 505 may be lower than the bottom surface 125 of the back bezel 120 but be higher than the lowest end of the sealant 400, and the shielding wall structure 505 is disposed at an outer position than the sealant 400 relative to a centre of the display device 40. In this way, the shielding wall structure 505 may cover a gap g between the base plate 510 of the rear housing 500 and the sealant 400 without interfering with the sealant 400. Specifically, when the shielding wall structure 505 and the sealant 400 are orthographically projected to a virtual plane that is perpendicular to the base plate 510 and is essentially approximately parallel to a side edge of the display device 40, the shielding wall structure 505 and the sealant 400 may overlap each other, so as to shield the gap g between the base plate 510 of the rear housing 500 and the sealant 400. Therefore, dust impurities and moisture can be prevented from entering or penetrating into the gap g, or that a user perceives the existence of the gap g can be avoided, thereby improving the reliability and wholeness of the end edge of the side edge of the entire display device 40.

Figure 6:
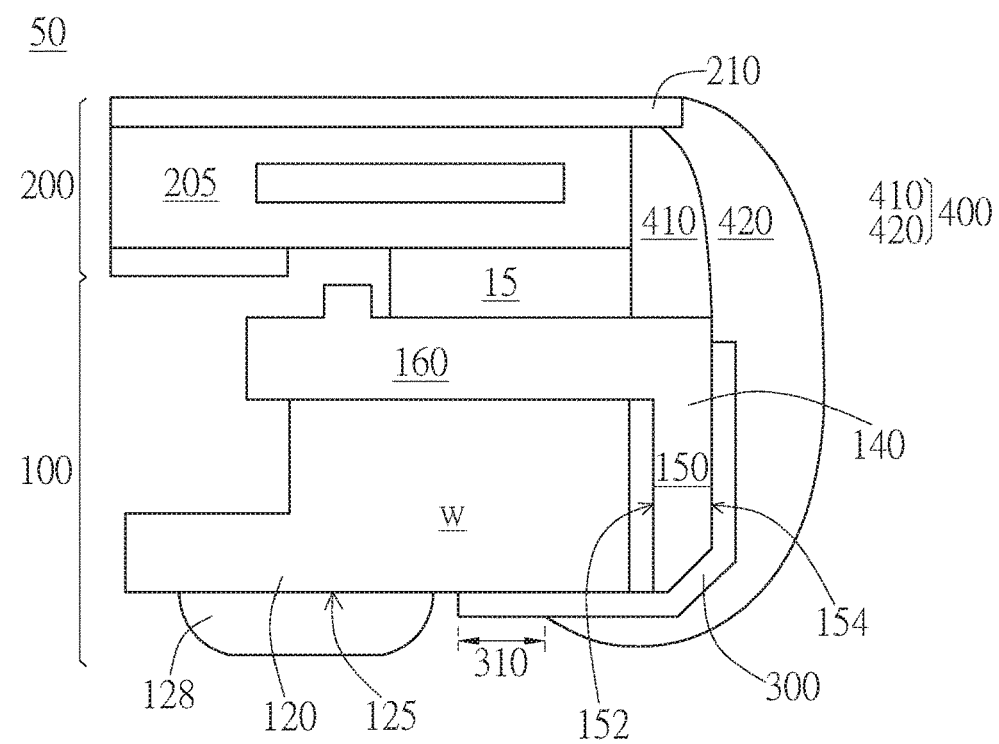
FIG. 6 is a cross-sectional view of a display device including a sealant with a first sealant block and a second sealant block according to an embodiment of the present invention.

A display device 50 according to another embodiment of the present invention is described below with reference to FIG. 6.

As described above, the display device 50 may include a structure the same as or similar to any one of the display devices 10 to 40 in the foregoing embodiments, and the difference lies in that the sealant 400 includes a first sealant block 410 and a second sealant block 420. Specifically, the first sealant block 410 is applied in a manner such as coating to be disposed above the frame 140, so as to cover the end edge of the display module 200. Further, the second sealant block 420 extends from the end edge of the display module 200 to the bottom surface 125 of the back bezel 120 through the outer side of the outer side surface 154 of the side wall portion 150 of the frame 140. In this aspect, the second sealant block 420 is disposed at an outer side than the first sealant block 410, thus covering the first sealant block 410 to prevent the first sealant block 410 from being exposed.

The first sealant block 410 and the second sealant block 420 may be made of different materials. By disposing the first sealant block 410 and the second sealant block 420, different materials may be respectively used according to the positions to meet different requirements. For example, the first sealant block 410 may be a material with features of higher rigidity and fast solidification, such as a light-irradiation solidification glue like an acrylic-based resin, and therefore the first sealant block 410 may serve as a main shading part. Compared with that, the second sealant block 420 may be a material with more elasticity such as a silicone resin, therefore the strength required for pulling and peeling when performing the rework and peeling can be reduced through deformation.

Specifically, when a rework process such as separating the display module 200 and the backlight module 100 for reassembly or assembly with other components needs to be performed, this configuration can reduce damage to the display module 200. That is, the first sealant block 410 can improve the wholeness of the end edge of the display module 200, and the second sealant block 420 can be peeled off when the sealant 400 is removed by peeling the tape 300 off. Accordingly, the backlight module 100 can be easily exposed for adjustment or element replacement while damage to the display module 200 can be reduced, and materials and time required for disposing the first sealant block 410 again can be saved or reduced. Additionally, the sealant 400 might be removed in two steps: first removing the second sealant block 420 and then removing the first sealant block 410, thereby contributing to reduce damage to the display device 50 when the display module 200 and the backlight module 100 are separated. Therefore, the convenience and reliability of the rework can be improved.

As described above, the second sealant block 420 is softer or more elastic than the first sealant block 410. In this way, the first sealant block 410 may reliably protect the display module 200, and the second sealant block 420 may be used to absorb outside impact. In addition, the softer second sealant block 420 may be peeled off conveniently with no fragment left. Further, the material of the second sealant block 420 may be deformed to reduce or loss the viscosity more easily compared with the material of the first sealant block 410, so that the second sealant block 420 can be peeled off more easily.

In addition, according to some embodiments of the present invention, the first sealant block 410 is an insulator. In this way, it can be reduced or avoided that an unexpected current is introduced into the display module 200 to cause damage to the display module 200. In addition, the second sealant block 420 may be an insulator or an electric conductor. When the second sealant block 420 is an electric conductor, the second sealant block 420 may assist in outputting the current unexpectedly generated in the display device 50 out of the display device 50, so as to avoid accumulated damage of electric charge to the display device 50, and may has a feature of anti-electro static discharge (ESD).

Next, a manufacturing process of a display device 60 according to an embodiment of the present invention is described below with reference to FIG. 7A to FIG. 7F.

Figures 7A, 7B:
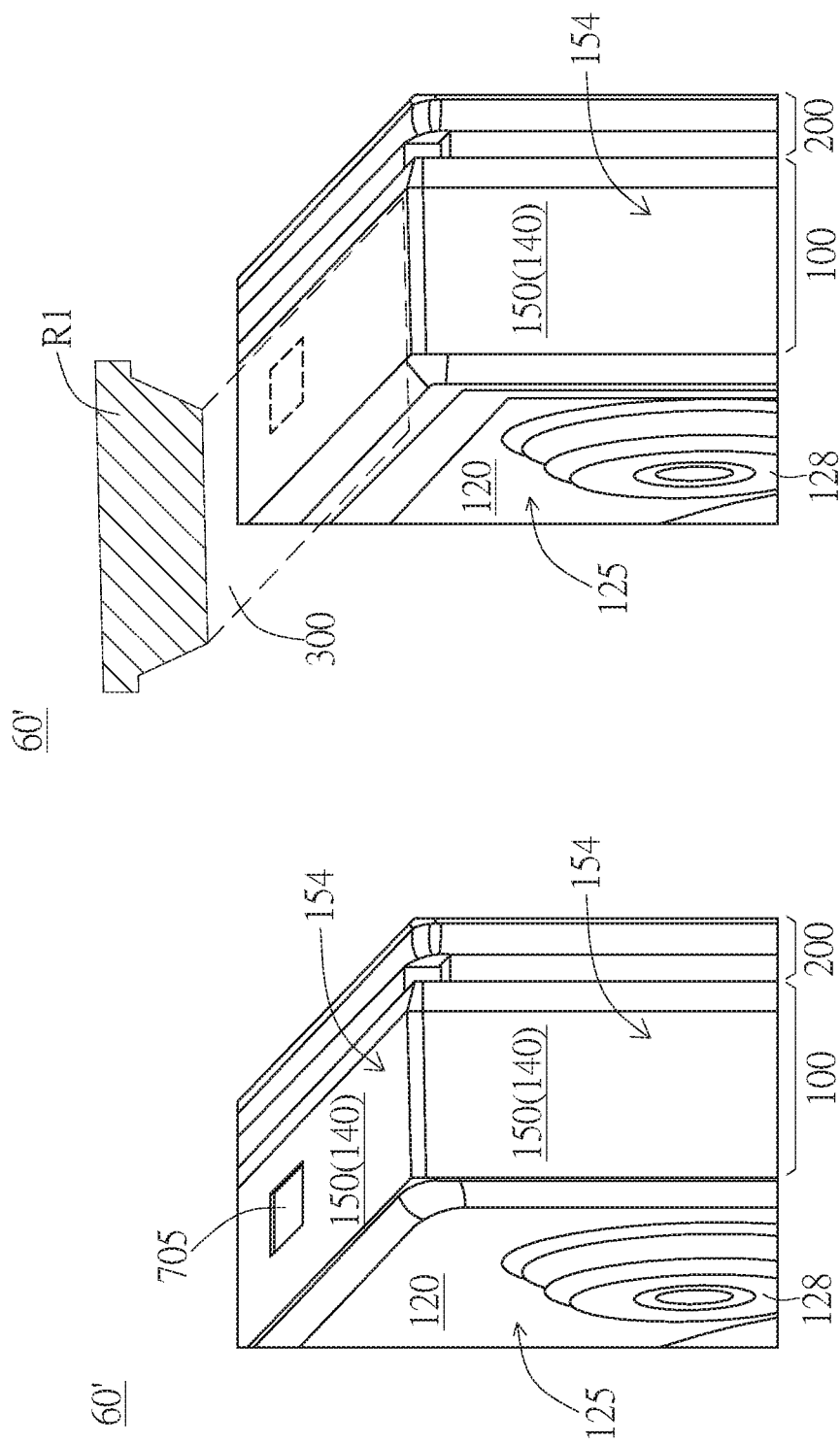
FIG. 7A to FIG. 7F are schematic diagrams of processes of attaching a tape and applying a sealant to a display device according to another embodiment of the present invention.

Referring to FIG. 7A, a display device 60' on which the tape 300 and the sealant 400 are not disposed is first provided. For example, the display module 200 of the display device 60' may be assembled with the backlight module 100 in a stacking manner. Then, referring to FIG. 7B with FIG. 7A, the tape 300 may be attached to the side wall portion 150 of the frame 140 of the display device 60'. For example, along the side wall portion 150 at one surface, the tape 300 may be dragged by a machine R1 to attach to the outer side surface 154 of the side wall portion 150, and the width of the tape 300 is greater than that of the surface of the side wall portion 150 such that the tape 300 protrudes towards the bottom surface 125. In a preferable embodiment, the tape 300 may cover an uneven structure 705 (for example, a clip, a hole, or a groove) on the display device 60'. The uneven structure 705 may be essentially any protruded or concave structure relative to the outer side surface of the display device 60', for example, a protruded or concave structure relative to the outer side surface 154 of the side wall portion 150 or the bottom surface 125 of the back bezel 120 of the display device 60'.

Figures 7C, 7D:
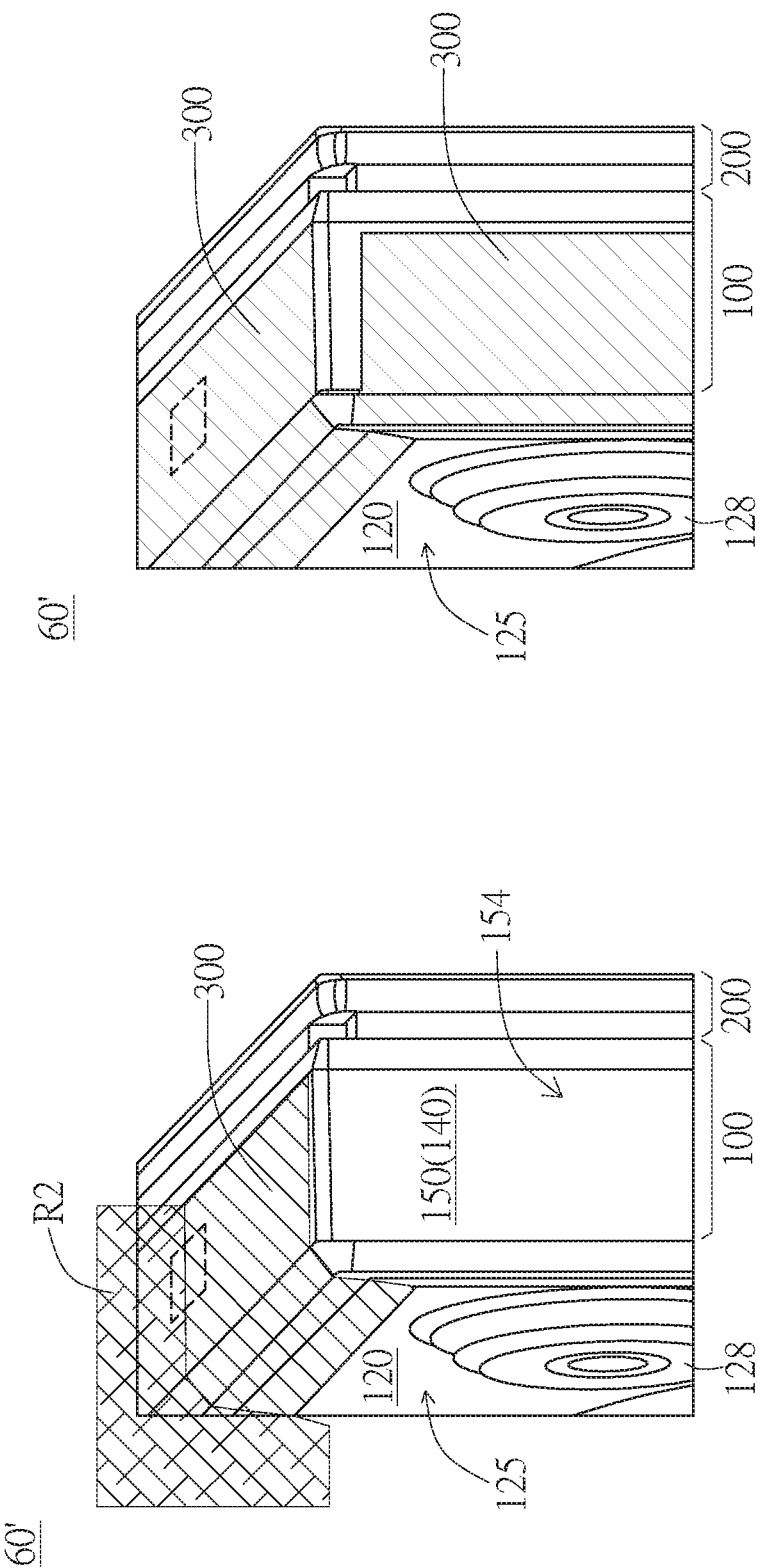
Figure 7E:
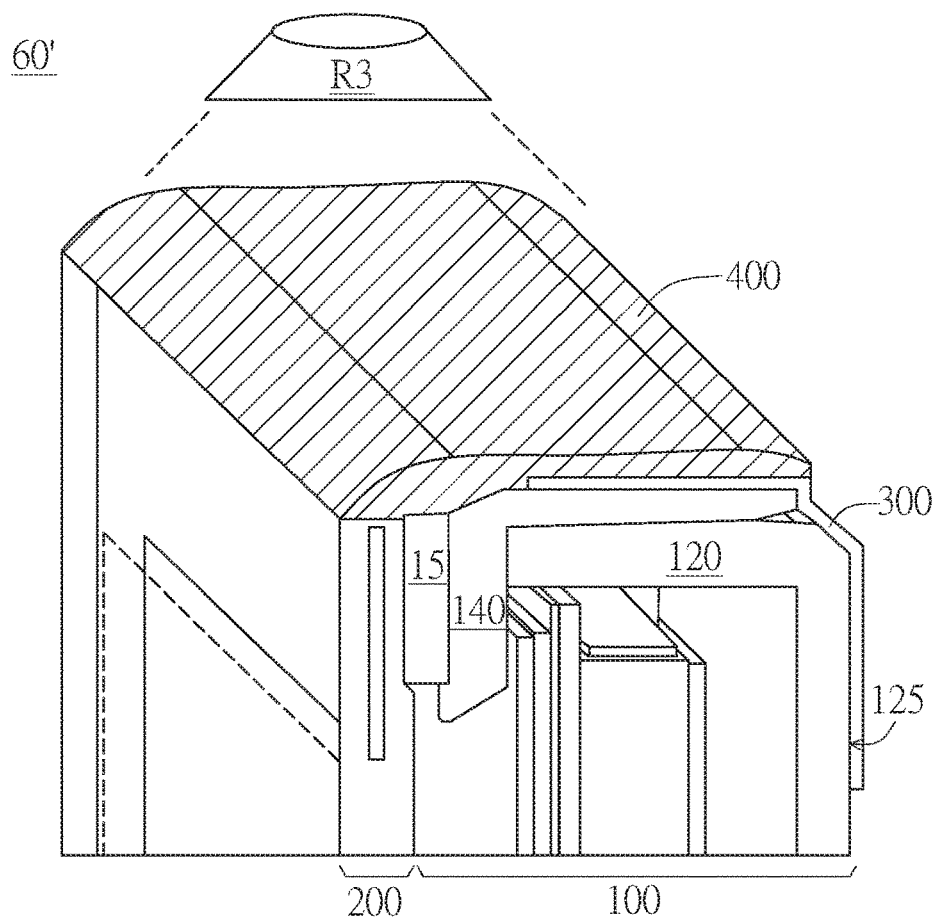
Figure 7F:
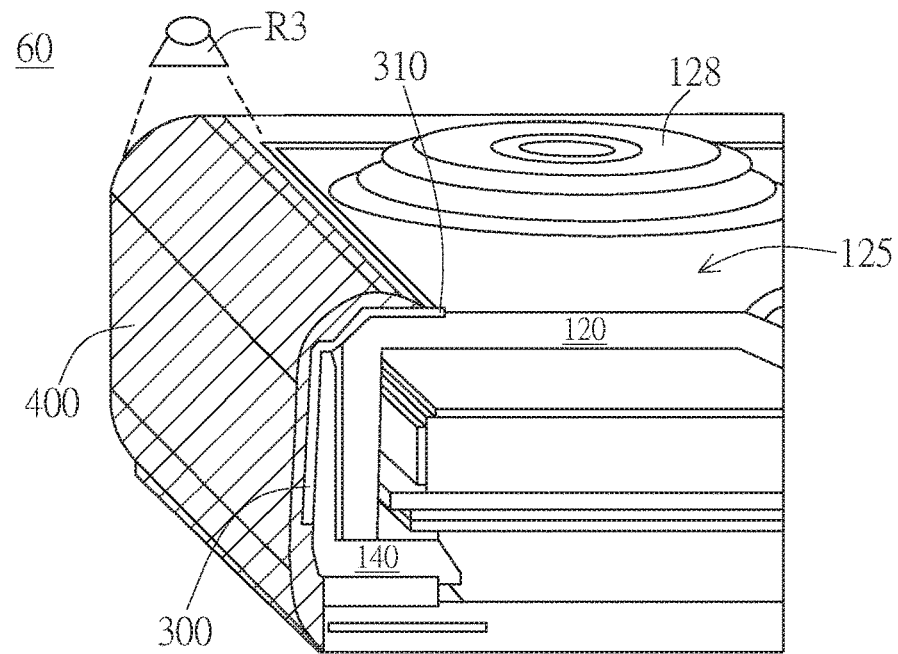

Still referring to FIG. 7C, after the tape 300 is attached, a pressing jig R2 may be used to press and level the tape 300 attached to the outer side surface 154 of the side wall portion 150 along the outer side surface 154 and the bottom surface 125, so as to make the tape 300 closely fitted with the outer side surface 154 and the bottom surface 125. In this way, the tape 300 may be more stably and closely attached to the outer side surface 154 of the side wall portion 150 and the bottom surface 125 of the back bezel 120.

Referring to FIG. 7D, similar to the foregoing manner with reference to FIG. 7A to FIG. 7C, the tape 300 may be attached to the outer side surface 154 of the side wall portion 150 and the bottom surface 125 of the back bezel 120 at an end edge of a corresponding side edge where the tape 300 is expected to be attached, and then be pressed and levelled. For example, the tape 300 can be attached to three side edges to which no circuit substrates are connected. Then, referring to FIG. 7E, the sealant 400 may be sprayed on the end edge of the side edge of the display module 200 and the backlight module 100 of the display device 60' by using a nozzle R3 along the side wall portion 150 first, so as to cover the end edge of the side edge of the display module 200 and the backlight module 100 of the display device 60' and cover the tape 300 attached to the outer side surface 154 of the side wall portion 150. The sealant 400 may be solidified by light-irradiation when it is sprayed (not shown in the figure). However, the solidification manner is not limited thereto. There are some manners such as heating curing or moisture curing, and is not particularly limited herein. Finally, referring to FIG. 7F in conjunction with FIG. 7E, after the foregoing steps are completed, the sealant 400 may be sprayed on the bottom surface 125 of the back bezel 120 by using the nozzle R3 again, so as to cover a part of the tape 300 on the bottom surface 125, and to combine with the sealant 400 sprayed on the end edge of the side edge of the display module 200 and the backlight module 100, thereby completing the display device 60 according to an embodiment of the present invention. In this case, preferably, at least one exposed portion 310 of the tape 300 is left on the bottom surface 125, so as to serve as an acting point for peeling in a subsequent rework process.

In view of the foregoing process, according to this embodiment, the sealant 400 completed in this way may cover the end edge of the side edge of the display module 200 and the backlight module 100 of the display device 60 and a part of the bottom surface 125 of the back bezel 120 of the display device 60, and may be applied by an automatic process. However, the foregoing process is only an example, and other various processes may be used to complete the display devices disclosed above in the embodiments, and the present invention is not limited thereto.

Figure 8A:
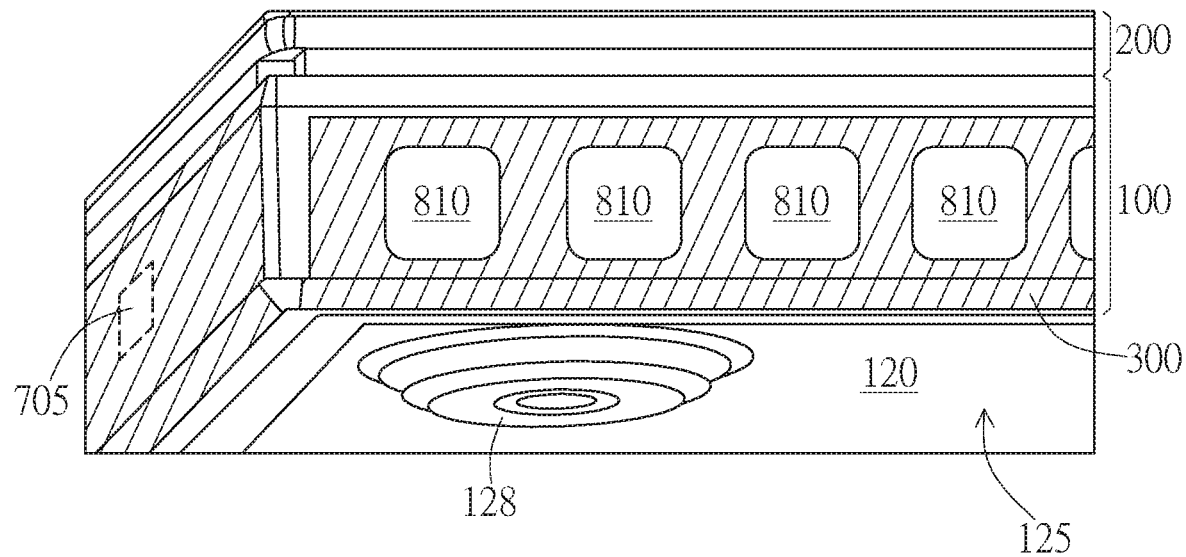
FIG. 8A and FIG. 8B are schematic diagrams of display devices having different tape structures according to embodiments of the present invention.
Figure 8B:
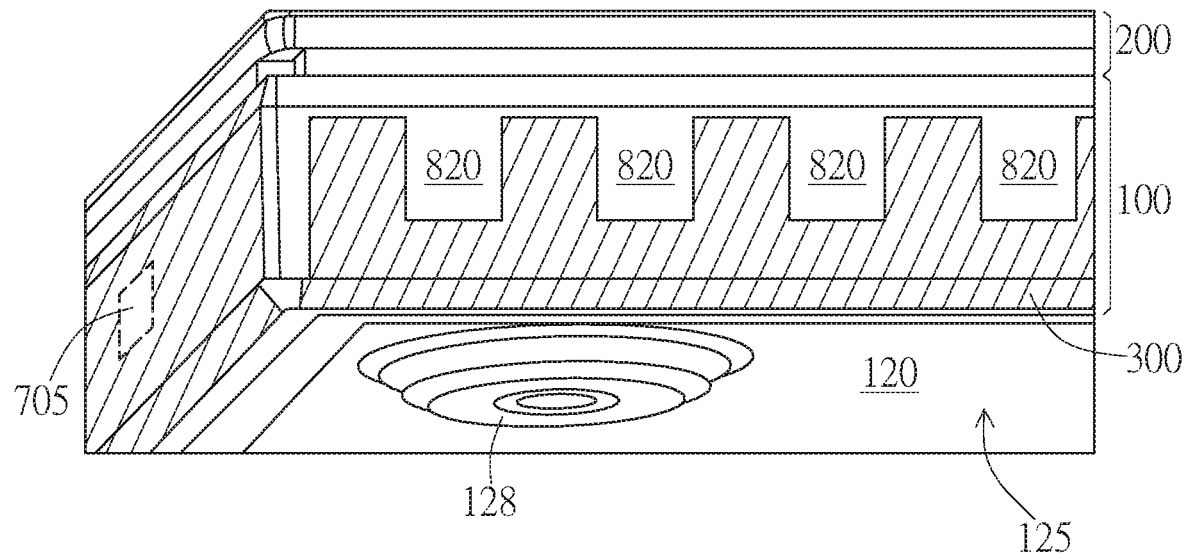

In addition, referring to FIG. 8A and FIG. 8B (corresponding to a state of the process described in FIG. 7C or FIG. 7D), a display device 70 and a display device 80 on which the sealant 400 is not disposed are respectively shown, and an attached form of the tape 300 described in the foregoing embodiments may essentially include various variations. For example, when the viscosity of the sealant 400 is greater than that of the tape 300, a part of the tape 300 attached to the outer side surface 154 of the side wall portion 150 of the frame 140 may have at least one opening 810 or at least one notch 820. In this way, the sealant 400 may be in direct contact with the outer side surface 154 of the side wall portion 150 of the frame 140 at the least one opening 810 or the at least one notch 820, thereby increasing the tightness and stability of the entire structure. For example, an unexpected loose and peeling off caused by a decrease or a loss of the viscosity of the tape 300 can be avoided by using the connection of the sealant 400.

Further, although the attached form of the tape 300 includes various variations, if there is at least one uneven structure 705 (for example, a clip, a hole, or a groove) on the outer side surface 154 of the side wall portion 150 of the frame 140 or on the bottom surface 125 of the back bezel 120, preferably, the tape 300 is attached to and covers the uneven structure 705. In this way, it can be reduced or avoided that the sealant 400 is in direct contact with the uneven structure 705. Therefore, the sealant 400 can be prevented from unexpectedly penetrating into the interior of the display device 70 or 80 from the uneven structure 705. Alternatively, an uneven or asymmetrical phenomenon that may occur when the sealant 400 is applied and disposed can be avoided or reduced.

In conclusion, according to the display devices of the embodiments of the present invention, a defect that may be generated when a frame is reduced or removed can be at least partially improved, so as to improve the assembly stability, reduce or avoid light leakage, and/or reduce that the dust impurities and moisture penetrate into the display device. Further, the sealant according to the embodiments of the present invention may be used as a frame, so as to reduce the assembly gap required when other exterior parts are assembled and to reduce a use of an exterior part including a relatively large structure thickness. Therefore, a narrow frame visual effect display device or even a frameless visual effect display device can be implemented, so as to improve user experience.

The foregoing descriptions are merely some preferable embodiments of the present invention. It should be noted that, various changes or modifications can be made to the present invention without departing from the spirit and principle of the present invention. A person of ordinary skill in the art should understand that, the present invention is defined by the appended claims. In addition, under the intention of the present invention, any possible variation such as replacement, combination, modification, and diversion shall not exceed the scope defined by the appended claims of the present invention.

LIST OF REFERENCE NUMERALS 10, 20, 30, 40, 50, 60, 60', 70, and 80: display device
15: adhesion element
100: backlight module
120: back bezel
125: bottom surface
128: protrusion portion
140: frame
150: side wall portion
152: inner side surface
154: outer side surface
160: top wall portion
200: display module
205: display panel
210: polarizer
300: tape
310: exposed portion
400: sealant
410: first sealant block
420: second sealant block
500: rear housing
505: shielding wall structure
510: base plate
600: fixing element
650: hole
705: uneven structure
810: opening
820: notch
S1, S2, S3, S4: side
G: component
W: wall
L: light
d: distance
g: gap
R1: machine
R2: pressing jig
R3: nozzle

What is claimed is:

1. A display device, comprising:
a backlight module, comprising:
  a back bezel, having a bottom surface; and
  a frame, having a side wall portion, wherein the side wall portion has an inner side surface and an outer side surface, and the back bezel faces the inner side surface of the side wall portion;
a display module, disposed on the backlight module and supported by the frame;
a tape, attached to the outer side surface of the side wall portion of the frame and extending to the bottom surface of the back bezel; and
a sealant, disposed and extending from an end edge of the display module to the bottom surface of the back bezel through an outer side of the outer side surface of the side wall portion of the frame, and at least partially covering the tape, wherein the tape is at least partially between the sealant and the frame which supports the display module;
wherein the sealant comprises a first sealant block and a second sealant block, and the second sealant block covers the first sealant block,
the first sealant block is disposed above the frame to cover the end edge of the display module, and
the second sealant block extends from the end edge of the display module to the bottom surface of the back bezel through the outer side of the outer side surface of the frame.

2. The display device according to claim 1, wherein the frame further comprises a top wall portion connected to the side wall portion, the back bezel further comprises a wall, and the wall extends in a direction away from the bottom surface of the back bezel, wherein the wall is below the top wall portion and abuts against to the top wall portion.

3. The display device according to claim 1, wherein the tape has an exposed portion at the bottom surface and not covered by the sealant.

4. The display device according to claim 1, further comprising a rear housing, wherein the rear housing has a base plate, and the base plate is located below the bottom surface of the back bezel at a distance.

5. The display device according to claim 4, wherein the rear housing further has a shielding wall structure protruding from a periphery of the base plate, if the display module is regarded as located above the backlight module to indicate directivity, then the shielding wall structure is higher than the lowest end of the sealant and is lower than the bottom surface of the back bezel, the shielding wall structure is disposed at an outer position than the sealant relative to a centre of the display device, and the shielding wall structure and the sealant overlap each other without interfering with the sealant.

6. The display device according to claim 1, wherein the display module comprises a display panel and a polarizer disposed at a top end of the display panel, and the sealant covers an end edge of the polarizer.

7. The display device according to claim 1, wherein the first sealant block is an insulator.

8. The display device according to claim 7, wherein the second sealant block is an electric conductor.

9. The display device according to claim 1, wherein the second sealant block is more elastic than the first sealant block.

10. The display device according to claim 1, wherein a material of the second sealant block is easier to deform and lose viscosity compared with a material of the first sealant block.

11. The display device according to claim 1, wherein the sealant is capable of absorbing light or reflecting light.

12. The display device according to claim 1, wherein the viscosity of the sealant is greater than the viscosity of the tape.

13. The display device according to claim 12, wherein a part of the tape attached to the outer side surface of the side wall portion of the frame has at least one opening or at least one notch, and the sealant is in direct contact with the outer side surface at the at least one opening or the at least one notch.

14. The display device according to claim 1, wherein at least one uneven structure is comprised on the outer side surface of the side wall portion of the frame or on the bottom surface of the back bezel, and the tape is attached to and covers the at least one uneven structure, so that the sealant disposed on the tape is not in direct contact with the at least one uneven structure.

15. The display device according to claim 1, wherein the tape is at least partially between the sealant and the back bezel.

* * * * *